US012798143B2

(12) United States Patent
King

(10) Patent No.: US 12,798,143 B2
(45) Date of Patent: Nov. 17, 2026

(54) CLAMPING ASSEMBLIES TO SECURE KNIVES TO SLICING MACHINES AND SLICING MACHINES EQUIPPED THEREWITH

(71) Applicant: Urschel Laboratories, Inc., Chesterton, IN (US)

(72) Inventor: Daniel Wade King, Valparaiso, IN (US)

(73) Assignee: Urschel Laboratories, Inc., Chesterton, IN (US)

( * ) Notice: Subject to any disclaimer, the term of this patent is extended or adjusted under 35 U.S.C. 154(b) by 469 days.

(21) Appl. No.: 18/085,800

(22) Filed: Dec. 21, 2022

(65) Prior Publication Data

US 2023/0202067 A1 Jun. 29, 2023

Related U.S. Application Data

(60) Provisional application No. 63/293,273, filed on Dec. 23, 2021.

(51) Int. Cl.

*B26D 7/26* (2006.01)
*B26D 1/02* (2006.01)
*B26D 7/06* (2006.01)

(52) U.S. Cl.

CPC ........... *B26D 7/2614* (2013.01); *B26D 1/025* (2013.01); *B26D 7/0691* (2013.01); *B26D 2210/02* (2013.01)

(58) Field of Classification Search

CPC ...... B26D 2210/02; B26D 1/035; B26D 1/36; B26D 1/365; B26D 7/225; B26D 1/157;
(Continued)

(56) References Cited

U.S. PATENT DOCUMENTS 4,523,503 A 6/1985 Julian et al.
4,590,835 A 5/1986 Matsuo
(Continued)

FOREIGN PATENT DOCUMENTS

CN 104582914 4/2015
EP 1584429 10/2005
(Continued)

OTHER PUBLICATIONS

Acknowledgement Receipt for Notice of Opposition for European Application No. EP19705188.1, filed Nov. 9, 2022, (2 pages).
(Continued)

*Primary Examiner* — Jonathan G Riley
(74) *Attorney, Agent, or Firm* — Hartman Global IP Law; Gary M. Hartman; Domenica N. S. Hartman

(57) ABSTRACT

Methods and equipment suitable for slicing products into lattice-type slices or chips. The methods and equipment utilize a knife assembly that includes a corrugated knife, a knife holder, and a clamp. A leading edge of the knife holder is defined by fingers and notches therebetween, and the fingers of the knife holder engage valleys in a first surface of the corrugated knife. The clamp is mated with a second surface of the corrugated knife and secures the corrugated knife to the knife holder. The clamp has a leading edge defined by fingers and notches therebetween. The fingers of the clamp engage valleys on the second surface of the corrugated knife, such that the fingers of the clamp are interdigitated with the fingers of the knife holder.

21 Claims, 17 Drawing Sheets

(58) Field of Classification Search

CPC .......... B26D 1/03; B26D 3/26; B26D 7/2614; B26D 7/0691; B26D 1/025; A23L 19/18; Y10S 83/932; Y10T 83/6473; Y10T 83/9372; Y10T 83/9464

USPC .... 83/403, 404, 404.2, 404.3; 426/496, 499, 426/518

See application file for complete search history.

(56) References Cited

U.S. PATENT DOCUMENTS

| | | | | |
|---|---|---|---|---|
| 4,937,084 | A | 6/1990 | Julian | |
| 5,095,875 | A | 3/1992 | Dowbiggin | |
| 5,211,097 | A | 5/1993 | Grasselli | |
| 5,819,628 | A | 10/1998 | Cogan et al. | |
| 7,178,440 | B2 | 2/2007 | Bucks | |
| 8,161,856 | B2 | 4/2012 | Jacko et al. | |
| 9,840,015 | B2 | 12/2017 | King et al. | |
| 10,328,598 | B2 | 6/2019 | King | |
| 2005/0150345 | A1 | 7/2005 | Bucks | |
| 2007/0240550 | A1 | 10/2007 | Jacko et al. | |
| 2009/0202694 | A1 * | 8/2009 | Julian | B26D 3/26 83/403 |
| 2014/0007751 | A1 | 1/2014 | Michel et al. | |
| 2016/0288356 | A1 | 10/2016 | Bucks | |
| 2016/0288358 | A1 * | 10/2016 | Bucks | B26D 1/36 |
| 2017/0072579 | A1 * | 3/2017 | Reis | A23L 19/18 |
| 2017/0087735 | A1 | 3/2017 | King | |
| 2019/0210239 | A1 | 7/2019 | Rust | |
| 2021/0086387 | A1 * | 3/2021 | Bucks | B26D 7/0691 |

FOREIGN PATENT DOCUMENTS

| | | |
|---|---|---|
| EP | 3527342 | 8/2019 |
| EP | 3800019 | 7/2021 |
| EP | 3755510 | 2/2022 |
| JP | 2016537213 | 12/2016 |
| WO | 2015075179 | 5/2015 |
| WO | 2019162278 | 8/2019 |

OTHER PUBLICATIONS

Cited Documents in Relation to EP3755510, dated Dec. 30, 2020, (2 pages).

Communication of Notices of Opposition (R. 79(1) EPC) for Application Serial No. 16849840.0, dated Oct. 20, 2021, (1 page).

Communication Under Rule 71(3) EPC for European Application No. 19 705 188.1, dated Oct. 19, 2021, (63 pages).

Decision to Grant a European Patent Pursuant to Article 97(1) EPC for European Application No. 19705188.1, dated Jan. 13, 2022, (2 pages).

Information Disclosure Statement with Cited References Attached for U.S. Appl. No. 16/970,640, filed Apr. 8, 2021, (131 pages).

Non-Final Rejection dated Jun. 15, 2021 for U.S. Appl. No. 16/970,640, (30 pages).

Notice of Opposition for European Patent No. EP3755510, dated Nov. 9, 2022 (5 pages).

Opposition Against Ep 3 755 510 (the Patent), entitled: Knife Assembly and Cutting System Equipped with Same In the Name of: FAM, (58 pages).

Third Party Submission Under 37 C.F.R. 1.290 for U.S. Appl. No. 16/970,640, filed Sep. 17, 2021 by Gary M. Hartman, (8 pages).

Examination Report for Australian Patent Application No. 2022421990 dated Apr. 9, 2025, (10 pages).

Examination Report for Canadian Patent Application No. 3240867 dated Apr. 29, 2025, (10 pages).

Notification of Reasons for Refusal for Japanese Patent Application No. 2024-536369 dated May 7, 2025 (6 pages).

International Preliminary Report on Patentability for International PCT Application No. PCT/US2022/053639, dated Jul. 4, 2024.

1st. Chinese Office Action for Chinese Patent Application No. 202280085112.4 (Translation), 6 pages.

* cited by examiner

CLAMPING ASSEMBLIES TO SECURE KNIVES TO SLICING MACHINES AND SLICING MACHINES EQUIPPED THEREWITH

CROSS-REFERENCE TO RELATED APPLICATIONS

This application claims the benefit of U.S. Provisional Application No. 63/293,273 filed Dec. 23, 2021, the contents of which are incorporated herein by reference.

BACKGROUND OF THE INVENTION

The present invention generally relates to methods and machines for cutting products, including but not limited to slicing food products. The invention particularly relates to machines equipped with a cutting head and an impeller assembly adapted to rotate within the cutting head, wherein the impeller assembly transports products to knives situated in the cutting head for slicing the products into slices or chips, including but not limited to food product slices or chips of the waffle or lattice type.

Various types of equipment are known for slicing, shredding and granulating food products, as nonlimiting examples, vegetables, fruits, dairy products, and meat products. Widely used machines for this purpose are commercially available from Urschel Laboratories, Inc., and include machines under the names Model CC® and Model CCL. The Model CC® and CCL machines are centrifugal-type slicers capable of slicing a wide variety of products at high production capacities. Whereas the Model CC® line of machines is particularly adapted to produce uniform slices, strip cuts, shreds and granulations, the Model CCL line is particularly adapted to produce slices or chips (hereinafter, collectively referred to as a slices or slice products) of a waffle or lattice type (hereinafter, collectively referred to as a lattice or lattice-type), nonlimiting examples of which are represented in FIG. 1.

From top to bottom, the images in FIG. 1 represent fine, coarse, and deep lattice cuts, which may be used to produce, as nonlimiting examples, lattice potato chips and potato waffle fries. As evident from FIG. 1, the opposing surfaces of the slices are characterized by a periodic pattern having a corrugated or sinusoidal shape with rounded peaks and valleys when viewed edgewise, though sharper peaks and valleys are also possible. The lattice cut is produced by sequentially crosscutting a product at two different angles, typically (though not necessarily) ninety degrees apart, using one or more knives each having a cutting edge formed to have the desired periodic pattern of the slices to be produced. Such a knife is referred to herein as a corrugated knife, which is intended to denote the presence of a cutting edge on the knife that is characterized by peaks and valleys when the knife is viewed edgewise, but is not restricted to cutting edges having peaks and valleys with any particular shape or pattern, periodic or otherwise.

Original versions of the Model CCL are represented in U.S. Pat. Nos. 3,139,127 and 3,139,130, whose contents are incorporated herein by reference. A representation of a Model CCL machine 10 is shown in FIG. 2, and drawings of a Model CCL machine 10 adapted from U.S. Pat. Nos. 3,139,127 and 3,139,130 are included herein as FIGS. 3 through 5. The machines 10 depicted in FIGS. 2 through 5 include a frame 12 that supports a power unit 14, a stationary cutter assembly (cutting head) 16, and a carriage or conveyor (impeller) assembly 18 that is rotatably disposed within the cutting head 16 for feeding products to the cutting head 16. The cutting head 16 and impeller assembly 18 are coaxial, and the cutting head 16 remains stationary while the impeller assembly 18 rotates within the cutting head 16 about their common axis 17 (FIG. 5). The cutting head 16 and impeller assembly 18 are enclosed in a housing 20, and products are delivered to the cutting head 16 and impeller assembly 18 through a feed hopper 22.

FIG. 4 represents a perspective view of the machine 10 of FIG. 3, with the hopper 22 retracted and the housing 20 and cutting head 16 removed to expose the impeller assembly 18, which is represented as having four tubular guides 24 that deliver products to the cutting head 16. As seen in FIGS. 3 and 4, each tubular guide 24 has a toothed flange 25 that engages a stationary ring 27 below the impeller assembly 18, so that rotation of the impeller assembly 18 about its vertical axis 17 causes the tubular guides 24 to rotate in unison about their respective longitudinal axes. While impellers and tubular guide 24 of the type depicted in FIG. 4 perform very well, other impeller configurations could possibly be adopted as the means for delivering products to the cutting head 16, including impellers equipped with paddles of the type used in the Model CC® line of machines.

FIG. 5 is an isolated top fragmentary view of the cutting head 16 and impeller assembly 18 of FIG. 3, and shows two of four knife stations located at the perimeter of the cutting head 16. Each cutting station is equipped with a corrugated cutting knife 26 secured to a segment 28 of the cutting head 16 between a knife holder 30 and a clamp 32. The assemblage of a knife 26, knife holder 30, and clamp 32 forms what will be referred to herein as a knife assembly 34. Rotation of the tubular guides 24 in unison about their respective longitudinal axes results in a desired lattice cut being generated in products as they encounter the knives 26. For example, the four tubular guides 24 may cause products to make an approximate one-quarter turn between each of the four knife stations of the machine 10 to create ninety-degree angular cuts in the slices. The machine 10 can be constructed to have fewer or more tubular guides 24 and/or knife stations, and the rotation of the tubular guides 24 can be synchronized to complete any rotation between the knife stations to achieve any desired angularity between slices.

From FIG. 3, it is evident that the interior of the cutting head 16 has a spheroidal surface. Consequently, the interior surfaces of the knife holders 30 (i.e., their surfaces facing the interior of the cutting head 16) also have spheroidal shapes. The hopper 22 delivers products to the impeller assembly 18, and centrifugal forces cause products to move outward into engagement with the interior spheroidal surface of the cutting head 16, including the interior surfaces of the knife holders 30. The interior surfaces of the knife holders 30 are referred to herein as registration surfaces of the knife holders 30. While engaged with the registration surfaces, in regular succession the products encounter and are sliced by the knives 26 circumferentially spaced within the cutting head 16.

FIG. 6 represents a fragmentary perspective view of a cutting head 16 and impeller assembly 18 corresponding to the machine 10 shown in FIGS. 3, 4, and 5, and is useful for further describing operating principles of a Model CCL. Product delivered to the feed hopper (not shown) enters the impeller assembly 18 through a central opening 42 at the top of the impeller assembly 18. The impeller assembly 18, including its four tubular guides 24, rotates about the vertical axis 17 shared with the cutting head 16. Centrifugal forces urge products 35 within the tubular guides 24 radially outward through the tubular guides 24 toward the radially outward extremities thereof as the tubular guides 24 rotate in unison about their respective longitudinal axes. With the assistance of longitudinal ribs or splines 38 within the interior passage of each tubular guide 24, the product 35 within each guide 24 also rotates about its horizontal axis as the impeller assembly 18 rotates about its vertical axis 17. As centrifugal forces hold the products 35 firmly against the spheroidal interior surface of the cutting head 16, the tubular guides 24 cause the products 35 to turn between each successive knife station, resulting in a lattice cut being generated in slices 36 as the knives 26 are encountered. As previously noted, a nonlimiting example is for the tubular guides 24 of the embodiment of FIGS. 3 through 6 to cause the products 35 to make an approximate one-quarter turn between each of the four knife stations, resulting in the slices 36 having a ninety-degree lattice cut as shown in FIG. 6.

FIG. 7 is an isolated perspective view of a cutting head 16 of a CCL machine 10 corresponding to the machine 10 shown in FIGS. 5 and 6. The cutting head 16 is again shown as comprising segments 28 that define the spheroidal interior surface of the cutting head 16, and corrugated cutting knives 26 secured to each segment 28 between a knife holder 30 and clamp 32. FIG. 8 evidences the curvature of a knife 26, knife holder 30, and clamp 32. As evident from FIGS. 7 and 8, the knife holder 30 defines a knife seat 44 that has a smooth cylindrical surface upon which a knife 26 of essentially any shape can be placed. Likewise, the knife clamp 32 has a simple arc on its leading (clamping) edge to clamp the knife 26 against the knife holder 30. The clamp 32 visible in FIG. 7 can be seen to have a sloping or tapered outer surface **32*a* at its leading edge (generally conical as a result of the arcuate shape of the clamp 32) to gently direct slices 36 up and over the clamp 32 as they leave the cutting head 16. As evident from FIG. 8, the peaks and valleys of the knife 26 and simple arcuate shapes of the knife holder 30 and clamp 32 result in the presence of gaps or openings 38 between the knife 26 and both the knife holder 30 and clamp 32**.

Further descriptions pertaining to the construction and operation of Model CCL machines are contained in U.S. Pat. Nos. 3,139,127 and 3,139,130.

CCL machines of the types described above have performed exceedingly well. Even so, as is apparent from FIG. 8, as products and slices pass over the knife holder 30 and clamp 32, a portion of the product and slice may scrape the leading edges of the holder 30 and clamp 32. Over time, the openings 38 between the shaped knife 26, knife holder 30 and clamp 32 may accumulate solids, for example, starch if the product being sliced is a vegetable or fruit. Though such accumulation does not pose an issue with well-maintained machines, if unattended the accumulated solids may eventually lever the knife 26 off the knife seat 44 of the knife holder 30, resulting in the production of thinner slices. If, as a result, the knife 26 is no longer rigidly registered against the knife seat 44 of the knife holder 30, the leading (sharp) edge of the knife 26 can become destabilized, diminishing slice accuracy and quality. Another issue that may be encountered is that, due to the dual rotary nature of the slicing action on a CCL machine, i.e., products rotating about the horizontal axis of the tubular guides 24 while also rotating about the vertical axis 17 of the impeller assembly 18, the knives 26 may experience a force that is transverse to the slicing force that occurs in a roughly horizontal direction. Over time, this transverse force may result in vertical movement of the knives 26 (i.e., parallel with the axis 17 of rotation of the impeller assembly 18), indicated by the arrow 40 in FIG. 8. These circumstances may become exacerbated by increasing the amplitude of the peaks and valleys of the knives 26, for example, the coarse and deep lattice cuts in comparison to the fine lattice cut depicted in FIG. 1.

FIGS. 9A, 9B, 10, and 11 represent knife assemblies and components thereof capable of use with the machines 10 of the types represented in FIGS. 2 through 7. As disclosed in U.S. Pat. No. 10,328,598, the knife assemblies are configured to reduce or eliminate potential issues previously discussed in reference to FIG. 8 as arising from the presence of openings 38 between the corrugated knife 26 and the simple arcuate shapes of the knife holder 30 and/or clamp 32 visible in FIG. 8. FIGS. 9A and 9B are perspective views of two versions of knife holders 130A and 130B. Each knife holder 130A and 130B is configured for assembly with a corrugated cutting knife, for example, the corrugated knife 126 shown mated with the knife holder 130B of FIG. 9B, so that a leading portion of the knife 126 that defines a cutting edge 127 projects beyond a leading edge 146A or 146B of the holder 130A and 130B, for example, as depicted in FIG. 9B. As previously noted, the knife 126 is considered to be "corrugated" as a result of its cutting edge 127, as well as at least adjacent portions of oppositely-disposed surfaces 129 and 131 of the knife 126 (FIGS. 9B and 11, respectively) that terminate at the cutting edge 127, being characterized by peaks and valleys when the knife 126 is viewed edgewise. As also previously noted, the knife is not restricted to any particular shape or pattern of peaks and valleys.

Each knife holder 130A and 130B is configured for assembly with a clamp, as a nonlimiting example, a clamp 132A shown in FIG. 10, for the purpose of clamping the corrugated knife 126 to either holder 130A or 130B. The knife holder 130A of FIG. 9A has a registration surface 142A formed to have a simple arcuate shape similar to that of the knife holder 30 seen in FIGS. 5, 7, and 8. The knife holder 130A further has a knife seat 144A that is opposite its registration surface 142A and formed to have a pattern of peaks and valleys complementary to peaks and valleys of a corrugated knife to be mated thereto, for example, the knife 126 shown mated with the knife holder 130B of FIG. 9B. Similarly, the knife holder 130B of FIG. 9B defines a knife seat 144B formed to have a pattern of peaks and valleys complementary to the peaks and valleys in the surface 129 of the corrugated knife 126 with which it is mated. The knife seats 144A and 144B are preferably configured to substantially or entirely fill the openings or gaps between the knife 126 and the knife holders 130A and 130B that would otherwise result from the valleys in the surface 129 of the knife 126 secured to the knife holder 130A or 130B.

The knife holder 130A of FIG. 9A has a blunt leading edge 146A as a result of the different surface contours of its registration surface 142A and knife seat 144A. In contrast, the registration surface 142B of the knife holder 130B of FIG. 9B does not have a simple arcuate shape, but instead is shaped to define a pattern complementary to that of the corrugated knife 126. The shapes of the registration surface 142B and knife seat 144B of the knife holder 130B are in phase, such that the leading edge 146B is sharp and substantially of constant thickness, in contrast to the periodically varying thickness that can be seen on the leading edge 146A of the knife holder 130A of FIG. 9A. In the nonlimiting examples of FIGS. 9A and 9B, the patterns of peaks and valleys on the knife 126, registration surface 142B, and knife seats 144A and 144B are periodic, as a nonlimiting example, substantially sinusoidal, although irregular patterns are also within the scope of the invention.

The periodic pattern of peaks and valleys on the knife seat 144A of the knife holder 130A of FIG. 9A provides improvements in both knife position retention and solids accumulation relative to the knife holder 30 depicted in FIGS. 5, 7 and 8. The knife holder 130B shown in FIG. 9B, further modified to have the periodic pattern seen on its registration surface 142B, further reduces solids accumulation by reducing scraping of products that might otherwise occur as a result of the blunt leading edge 146A of the knife holder 130A of FIG. 9A formed by the simple arcuate shape of its registration surface 142A.

The knife clamp 132A of FIG. 10 is adapted to be assembled with either of the knife holders 130A and 130B of FIGS. 9A and 9B to clamp a corrugated knife thereto. As a nonlimiting example, FIG. 11 represents a knife assembly 134 as comprising a corrugated knife 126, the knife holder 130B of FIG. 9B, and the clamp 132A of FIG. 10 assembled with the knife holder 130B to clamp the knife 126 to the knife seat 144B of the knife holder 130B. Similar to the clamp 32 in FIG. 7, the clamp 132A can be seen to have a tapered portion (generally conical as a result of the arcuate shape of the clamp 132A) that defines a sloping outer surface 156 at its leading edge to gently direct slices up and over the clamp 132A as they leave the cutting head. The tapered portion of the clamp 132A is fabricated to define extensions or “fingers” 148 sized and arranged to protrude into valleys in the surface 131 of the knife 126 that faces the clamp 132A when the two are assembled, as seen in FIG. 11. The fingers 148 are preferably capable of at least partially closing openings or gaps between the clamp 132A and the knife 126 that are present as a result of the valleys in the knife’s surface 131, thereby reducing solids accumulation in the gaps. For this purpose, the fingers 148 sufficiently protrude into the valleys in the surface 131 facing the clamp 132A to close the openings to the gaps that exist between the knife 126 and clamp 132A. Alternatively or in addition, the fingers 148 may improve the stability of the cutting edge 127 of the knife 126 by reducing the cantilevered beam length of the knife 126, which as used herein refers to the length or distance between the cutting edge 127 of the knife 126 and the nearest adjacent support defined by the leading edge of either the knife holder 130A or 130B or clamp 132A, whichever is closer. In FIG. 11, the cantilevered beam length ($L_{cb}$) of the knife 126 is the length or distance between the cutting edge 127 of the knife 126 and the leading edge 152 of the clamp 132A. In this case, the nearest adjacent extremity of the leading edge 152 of the clamp 132A is defined by the individual distal tips of the fingers 148, which physically engage the surface 131 of the knife 126 within the valleys facing the clamp 132A as shown in FIG. 11. The fingers 148 and resulting notches or recesses 150 therebetween define a pattern (as a nonlimiting example, a periodic pattern) complementary to the pattern of the knife 126 secured with the clamp 132A to the knife holder 130B.

As in FIG. 9B, the knife seat 144B (not visible in FIG. 11) of the knife holder 130B may be formed to have a periodic pattern that is complementary with the surface 129 of the corrugated knife 126 to substantially or entirely eliminate openings or gaps therebetween that would otherwise result from the valleys on the knife surface 129.

It is also within the scope of the invention that a knife holder 130B of the type shown in FIG. 9B could be sufficiently sharpened to serve as a corrugated knife, eliminating the need for a separate knife 126 and clamp 132A, and thereby inherently avoiding the tendency for solids to accumulate within the valleys present in the surfaces 129 and 131 of the knife 126 as a result of its corrugated shape.

Though CCL machines equipped with knives, knife holders, and clamps of the types described above have performed exceedingly well, further improvements are continuously sought.

BRIEF DESCRIPTION OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides methods and equipment suitable for slicing products into slices or chips of the lattice type.

According to one aspect of the invention, a knife assembly is provided that includes a corrugated knife, a knife holder, and a clamp. A leading edge of the knife holder is defined by fingers and notches therebetween, and the fingers of the knife holder engage valleys in a first surface of the corrugated knife. The clamp is mated with a second surface of the corrugated knife and secures the corrugated knife to the knife holder. The clamp has a leading edge defined by fingers and notches therebetween, and the fingers of the clamp engage valleys on the second surface of the corrugated knife such that the fingers of the clamp are interdigitated with the fingers of the knife holder.

According to another aspect of the invention, a knife assembly is provided for use in a slicing machine adapted to slice products. The knife assembly includes a corrugated knife, a knife holder, and a clamp. The corrugated knife has oppositely-disposed first and second surfaces that terminate at a cutting edge. The cutting edge and at least portions of the first and second surfaces adjacent thereto are characterized by a pattern of peaks and valleys so that peaks and valleys are present on the first surface and peaks and valleys are present on the second surface. The knife holder has a registration surface and an oppositely-disposed knife seat that terminate at a leading edge. The knife seat is mated with the first surface of the corrugated knife and comprises a pattern of peaks and valleys complementary to the peaks and valleys in the first surface of the corrugated knife. The leading edge of the knife holder is defined by fingers and notches therebetween. The fingers of the knife holder engage at least some of the valleys in the first surface of the corrugated knife. The notches of the knife holder engaging at least some of the peaks in the first surface of the corrugated knife. The clamp is mated with the second surface of the corrugated knife and secures the corrugated knife to the knife seat of the knife holder. The clamp has a leading edge defined by fingers and notches therebetween that define a pattern complementary to the peaks and valleys in the second surface of the corrugated knife. The fingers of the clamp engage at least some of the valleys on the second surface of the corrugated knife, wherein the fingers of the clamp are interdigitated with the fingers of the knife holder.

Other aspects of the invention include machines and methods for cutting products using knife assemblies of the type described above to produce slice products. Such a machine or method delivers products to a perimeter of a cutting head through action of rotating an impeller assembly and a delivering means associated therewith, and slicing the products with a corrugated knife to produce slices or chips of a lattice type.

Technical effects of knife assemblies, methods and machines described above preferably include the ability to increase the stability and rigidity of a corrugated knife during a slicing operation performed with the knife assemblies, thereby promoting quality and consistency of slice products produced with the knife assemblies.

Other aspects and advantages of this invention will be appreciated from the following detailed description.

DETAILED DESCRIPTION OF THE INVENTION

Figure 1:
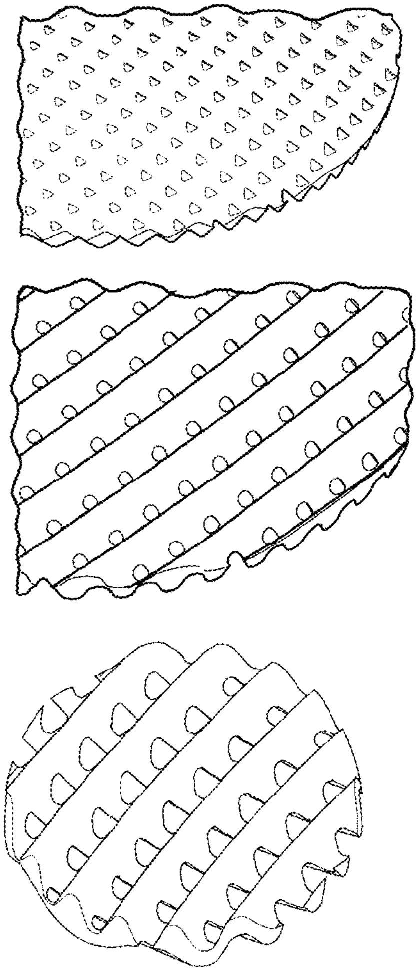
FIG. 1 schematically represents lattice-type slices that may be produced with machines and components of the types represented in FIGS. 2 through 8.
Figure 2:
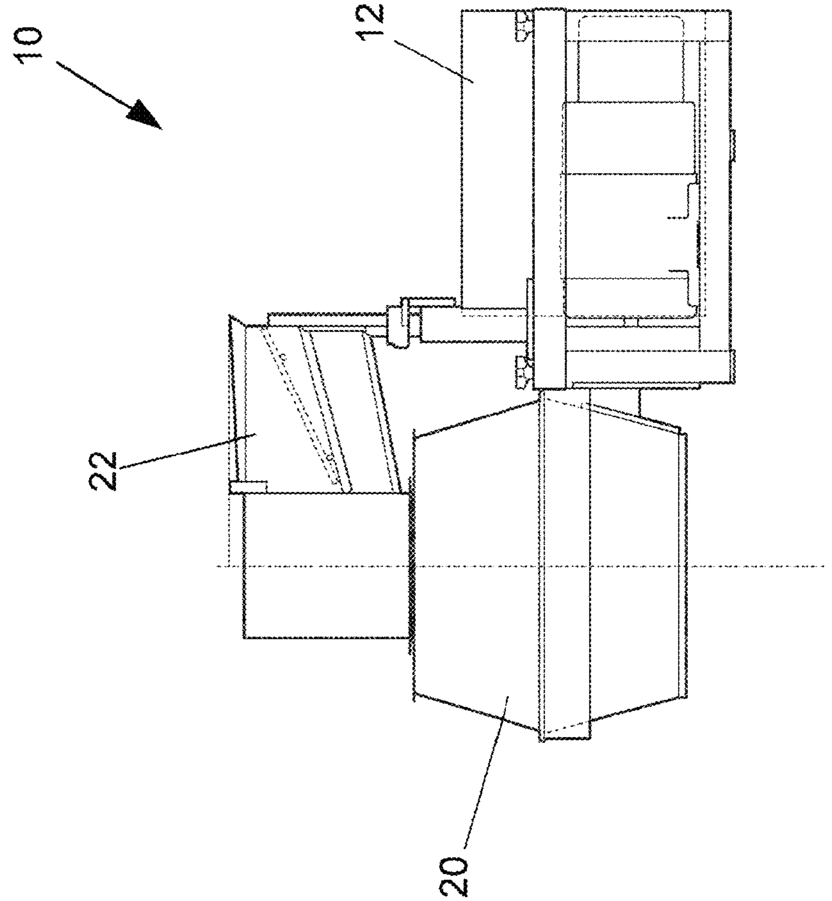
FIG. 2 (Prior Art)
FIG. 2 is a side view representing a Model CCL machine known in the art.
Figure 3:
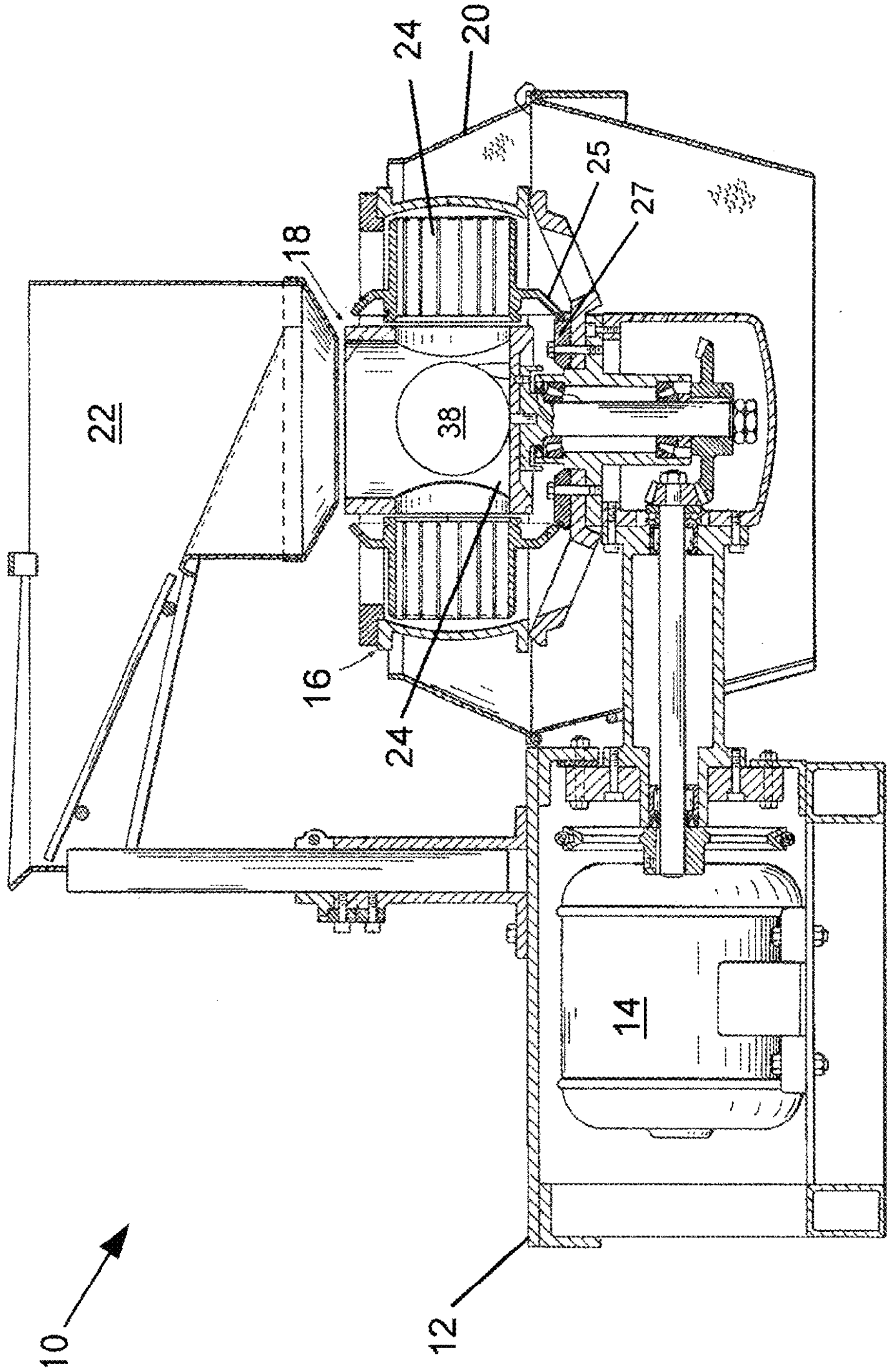
FIG. 3 (Prior Art)
FIG. 3 is a side view in partial cross-section of a Model CCL machine.
Figure 4:
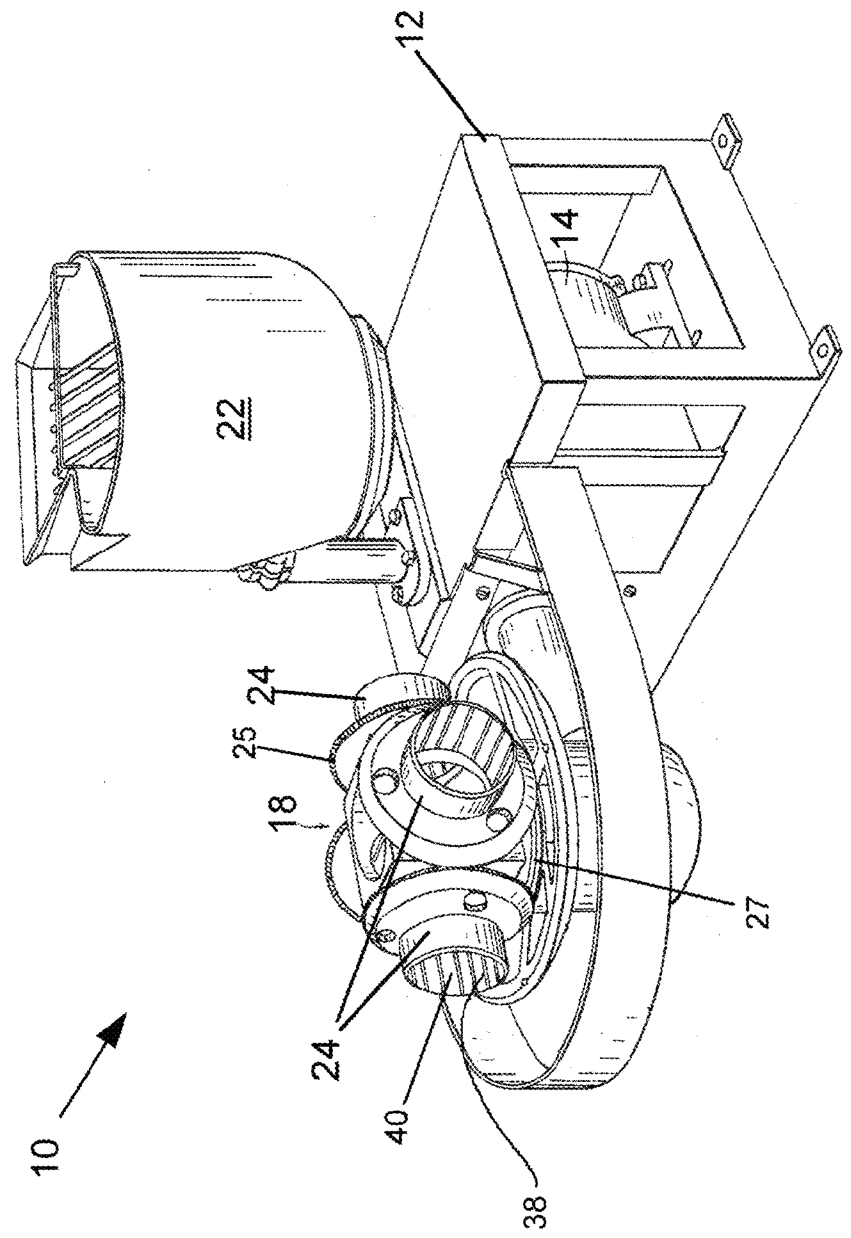
FIG. 4 (Prior Art)
FIG. 4 is a perspective view of the machine of FIG. 3, with a housing and cutting head removed to expose an impeller assembly.
Figure 5:
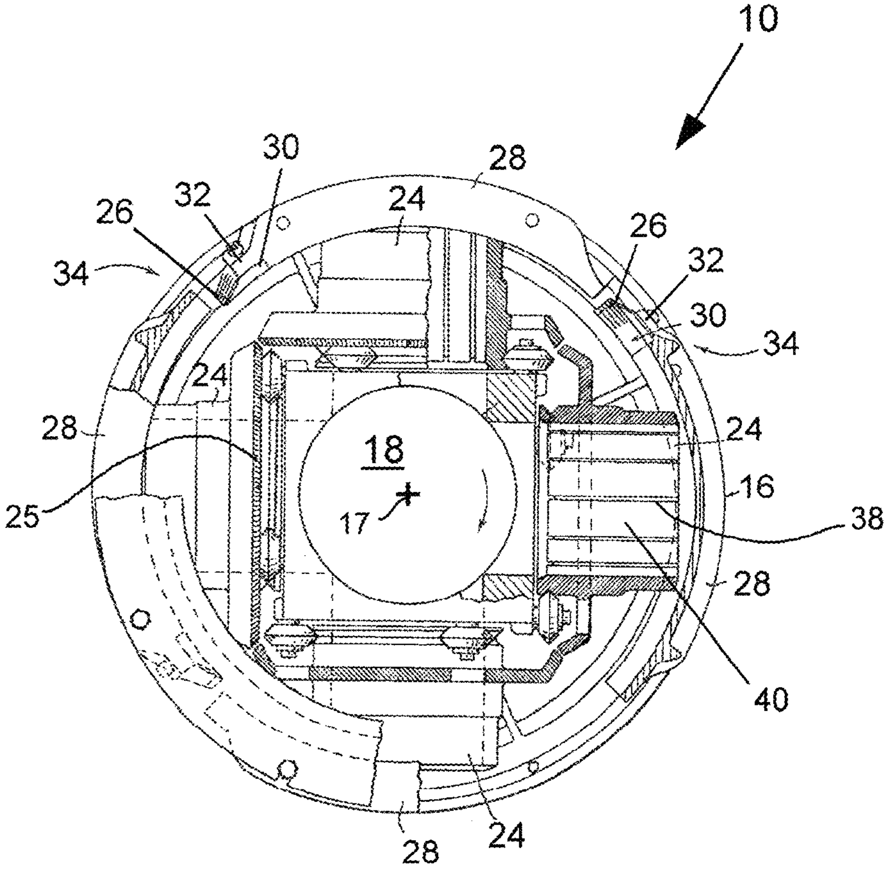
FIG. 5 (Prior Art)
FIG. 5 is a top fragmentary view of the cutting head and impeller assembly of the machine of FIG. 3.
Figure 6:
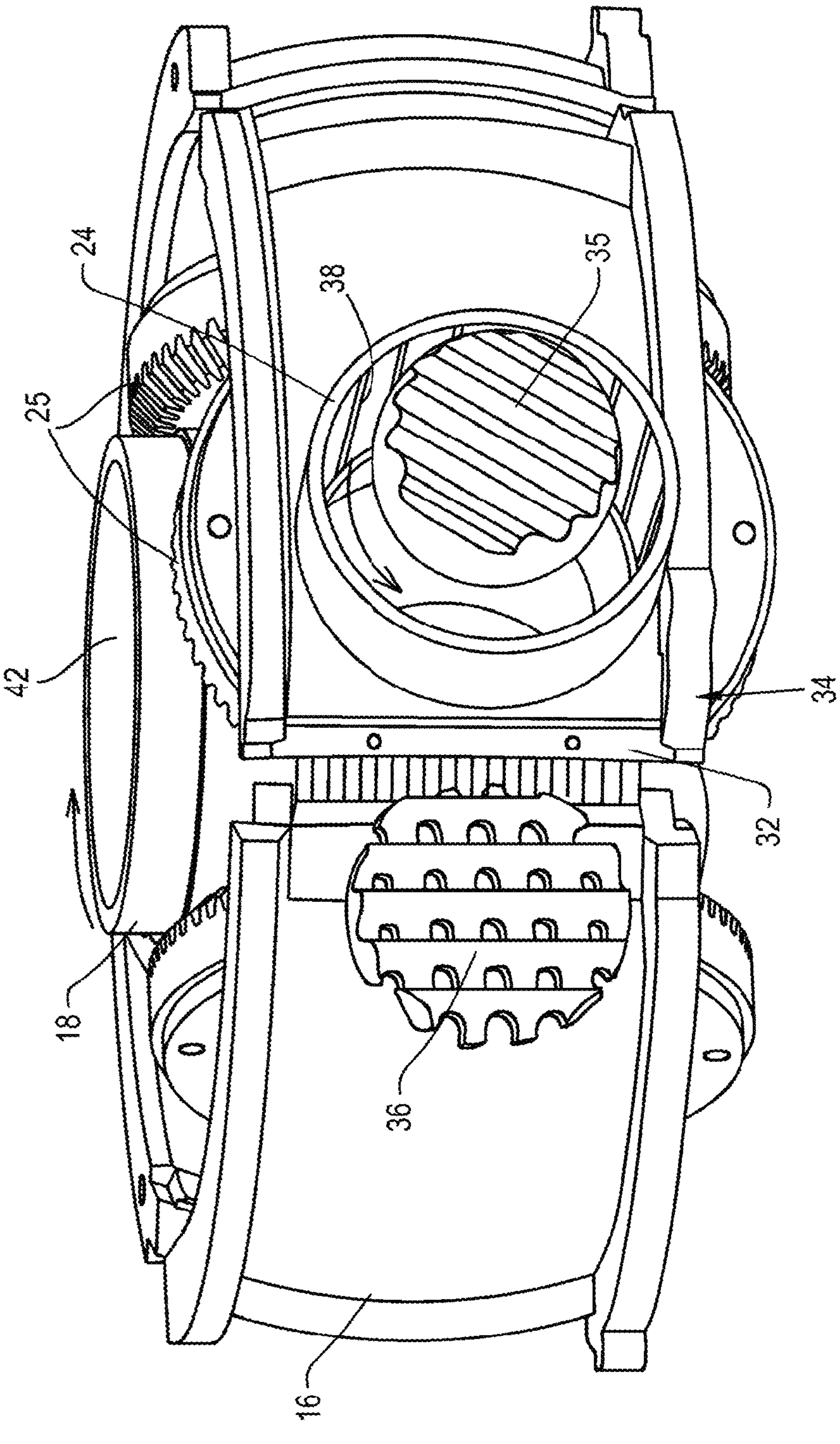
FIG. 6 (Prior Art)
FIG. 6 is a perspective view of a cutting head and impeller assembly of a Model CCL machine.
Figure 7:
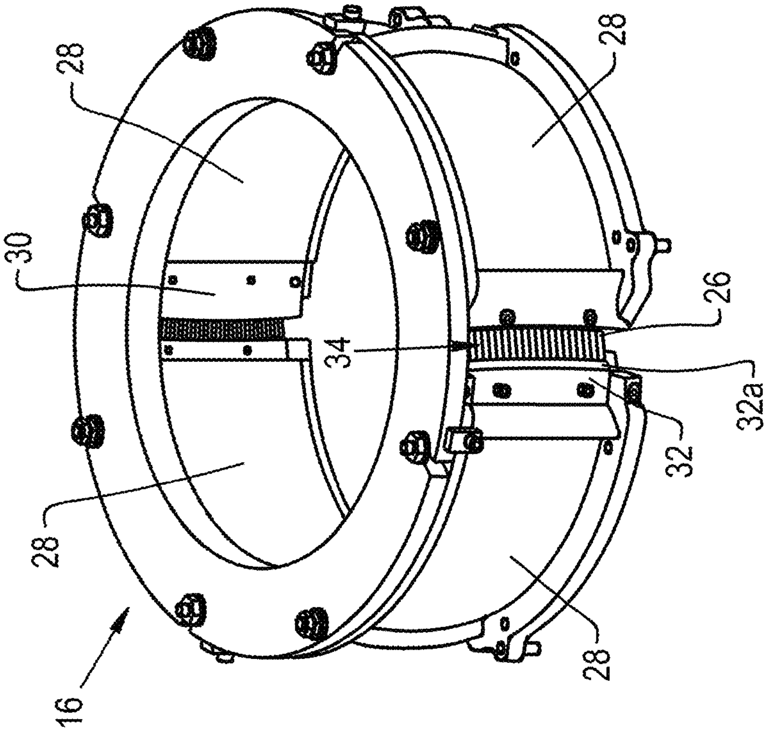
FIG. 7 (Prior Art)
FIG. 7 is a perspective view representing the cutting head of FIG. 6.

The intended purpose of the following detailed description of the invention and the phraseology and terminology employed therein is to describe what is shown in the drawings, which include the depiction of one or more nonlimiting embodiments of the invention, and to describe certain but not all aspects of the depicted embodiment(s). The following detailed description also identifies certain but not all alternatives of the depicted embodiment(s). Therefore, the appended claims, and not the detailed description, are intended to recite what at least provisionally are believed to be aspects of the invention, including certain but not necessarily all of the aspects and alternatives described in the detailed description.

Figure 12:
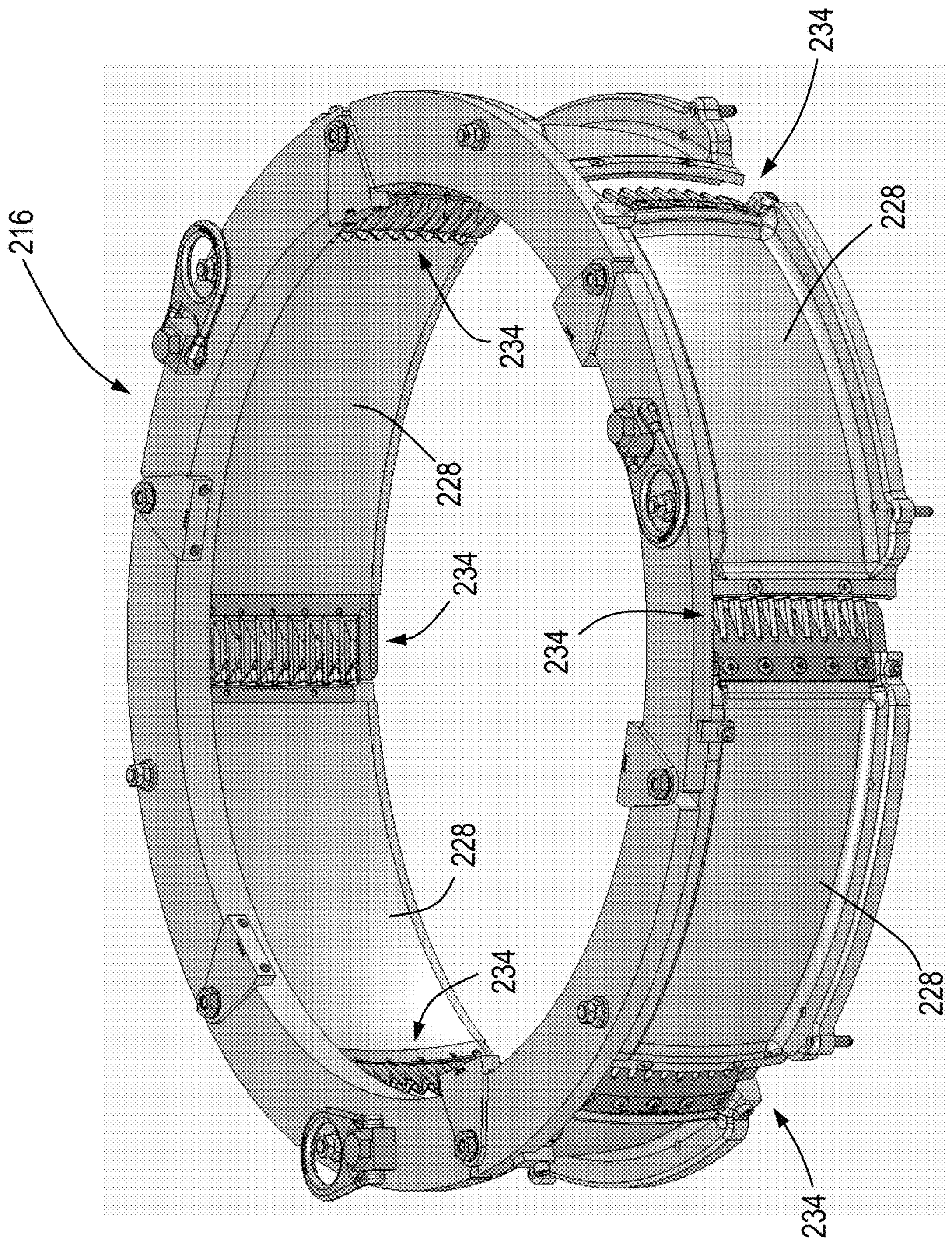
FIG. 12 is a perspective view of a cutting head in accordance with nonlimiting aspects of the invention.

FIG. 12 represents a cutting head 216 equipped with multiple knife assemblies 234 mounted to segments 228 of the cutting head 216. The particular embodiment of the cutting head 216 represented in FIG. 12 has a spheroidal interior surface, may be suitable for use with machines having certain features similar to the machines 10 represented in FIGS. 2 through 7, and in some instances may be a modification or retrofit of such a machine 10. Nonlimiting embodiments of the invention will be illustrated and described hereinafter in reference to a machine having components arranged as described for the machine 10 in FIGS. 2 through 7, though it will be appreciated that the teachings of the invention are more generally applicable to a variety of machines. Furthermore, though the knife assemblies 234 and components thereof represented in FIGS. 12 through 21 will be discussed in reference to slicing food products, it should be understood that the knife assemblies, as well as cutting heads, impeller assemblies, and machines to which they may be assembled, can be utilized to cut other types of products.

Figure 8:
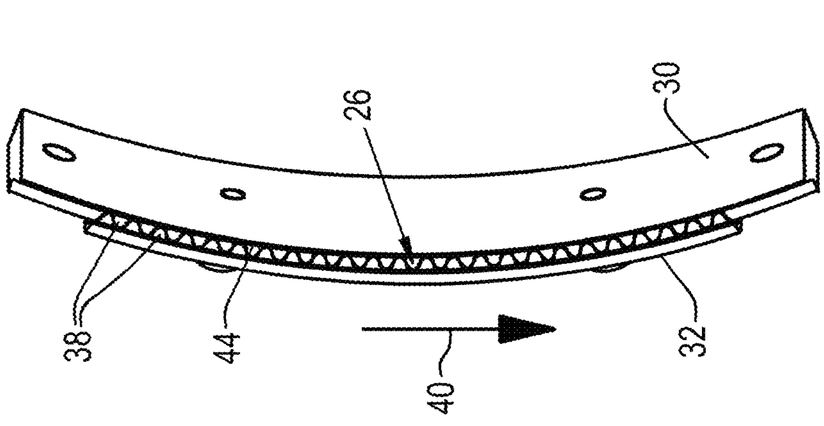
FIG. 8 (Prior Art)
FIG. 8 is an edge view of a knife assembly of the cutting head of FIG. 7, and depicts the relative cross-sectional shapes of a knife holder, a knife clamp, and a knife secured therebetween.

The knife assemblies 234 and their components represented in FIGS. 12 through 21 are configured to increase the stability and rigidity of corrugated knives 226 during a slicing operation performed with the knife assemblies 234. In so doing, the knife assemblies 234 and their components are also preferably capable of reducing the accumulation of solids between the leading edges of the knives 226, knife holders 230, and/or clamps 232 of the knife assemblies 234 and reducing vertical movement of the knives 226 (e.g., arrow 40 in FIG. 8), i.e., parallel with the axis of rotation of an impeller assembly (as a nonlimiting example, the impeller assembly 18 of FIGS. 3 through 6 and its axis 17 identified in FIG. 5).

Figure 13:
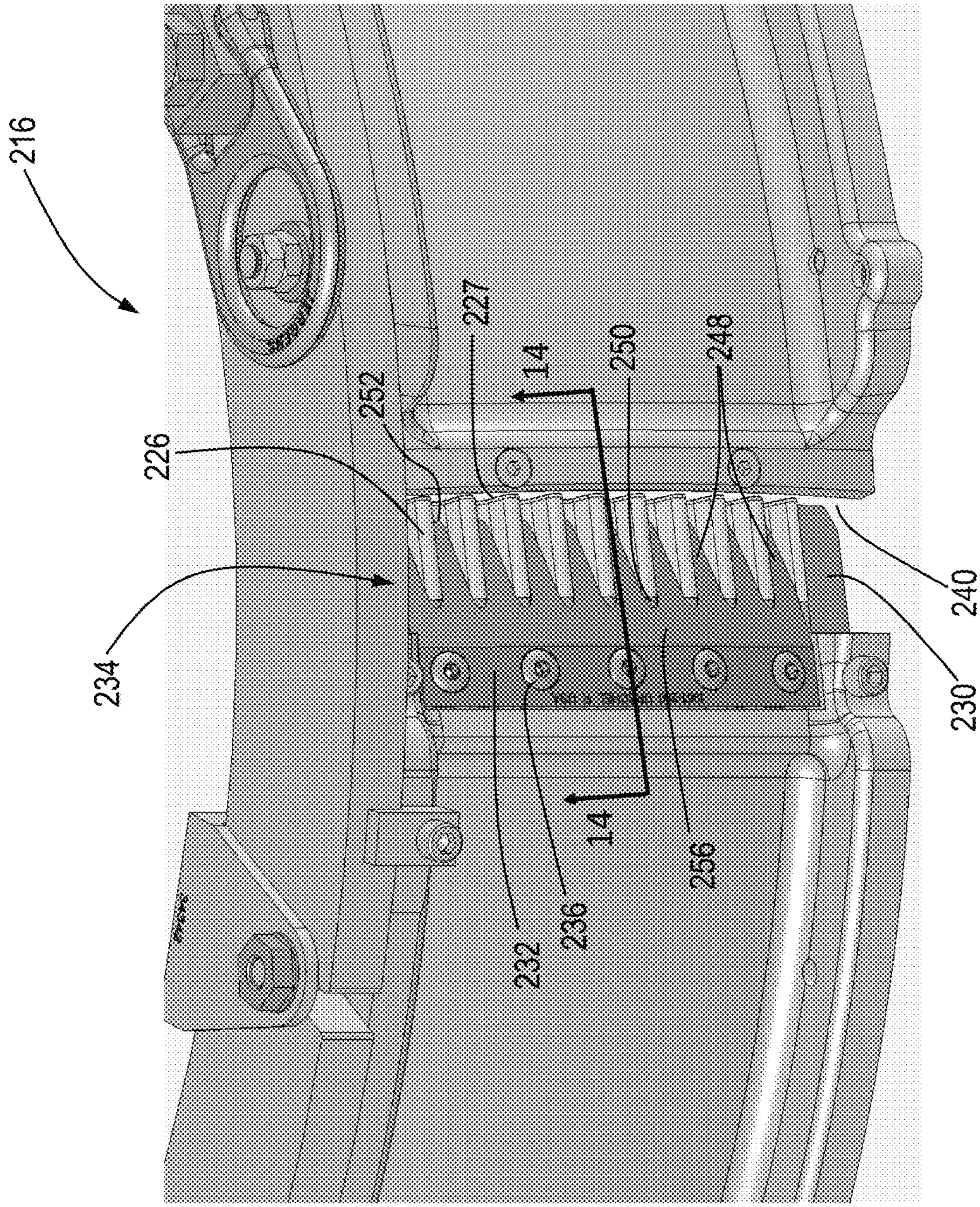
FIGS. 13 and 14 are, respectively, fragmentary perspective and fragmentary cross-sectional views of the cutting head of FIG. 12 and show details of a knife assembly of the cutting head in accordance with nonlimiting aspects of the invention. The cross-section of FIG. 14 is taken along section line 14-14 of FIG. 13 and represents details of a knife, a knife holder, and a clamp of the knife assembly.
Figure 14:
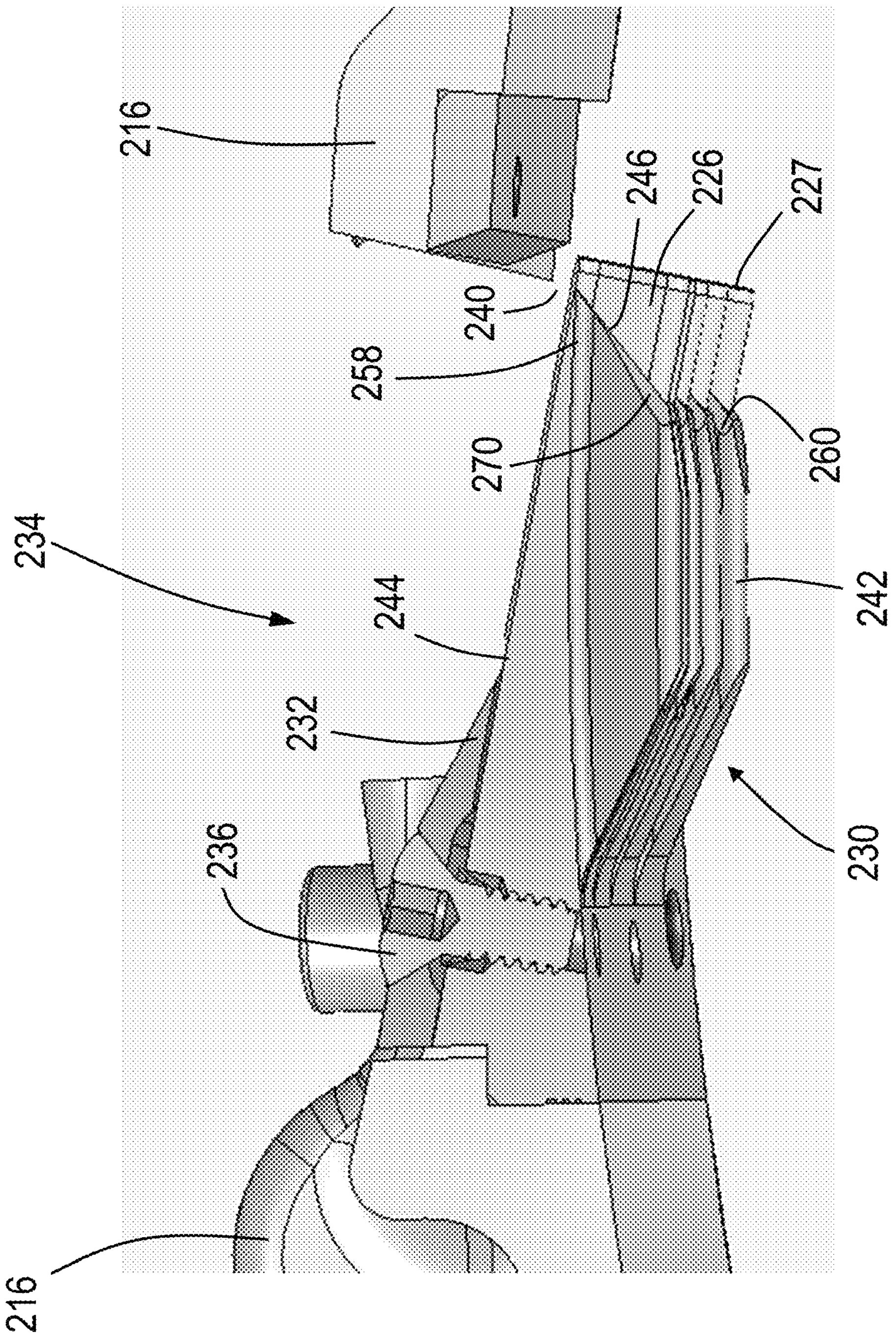
Figure 15:
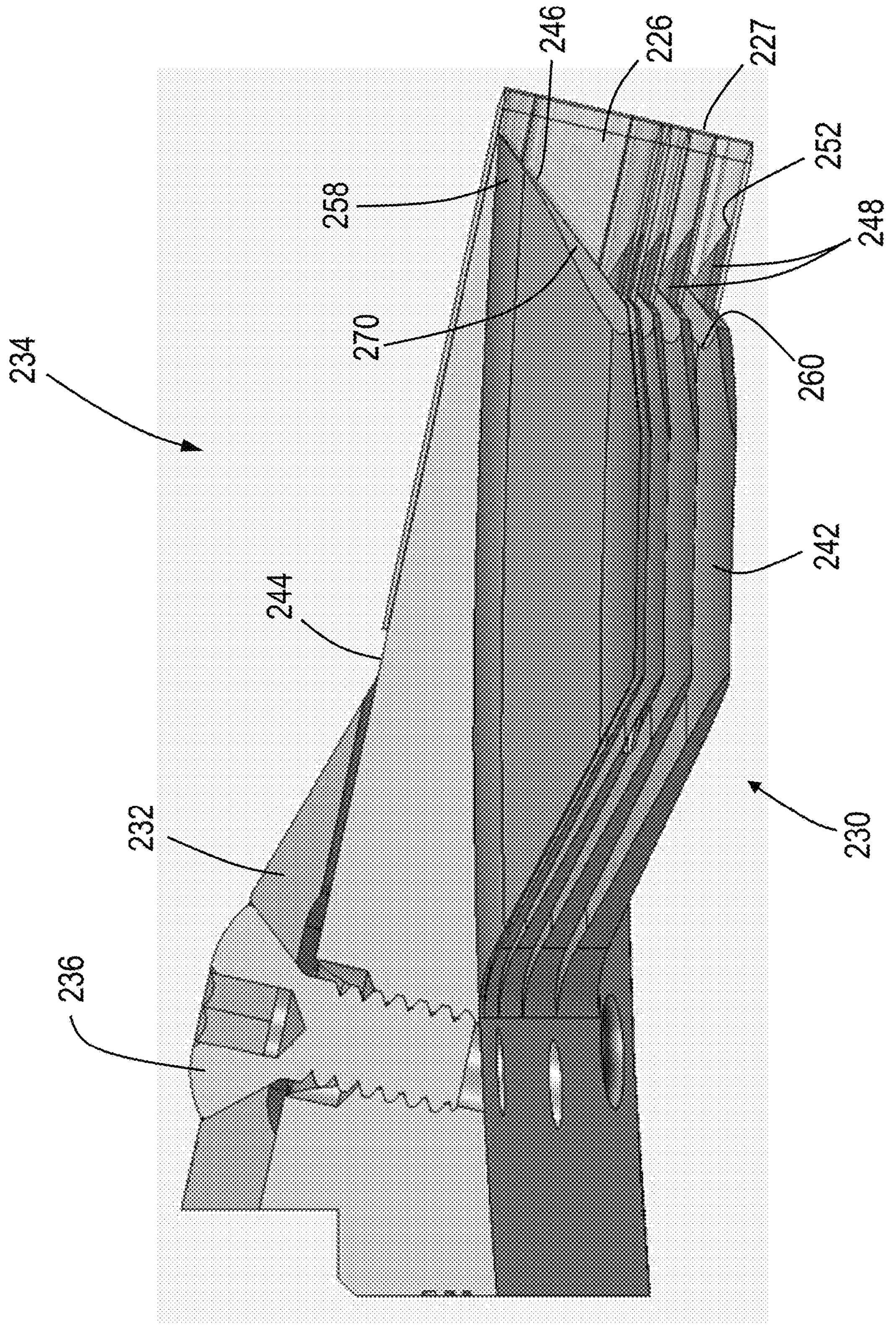
FIG. 15 is an isolated cross-sectional view of the knife assembly of the cutting head of FIG. 12 to show additional details of the knife, knife holder, and clamp of the knife assembly. The knife is shown as translucent in order to reveal fingers of the clamp that engage the opposite (exterior) side of the knife facing the exterior of the cutting head of FIG. 12.

FIGS. 13 through 17 depict various views of a knife assembly 234 of the cutting head 216 of FIG. 12. As noted above, the knife assembly 234 comprises a corrugated knife 226, a knife holder 230, and a clamp 232. The clamp 232 can be secured to the knife holder 230 in any suitable manner capable of clamping the knife 226 therebetween, as a nonlimiting example, with fasteners 236 that secure the clamp 232 to the knife holder 230. A product that encounters the knife 226, for example, as a result of being delivered by an impeller (as a nonlimiting example, the impeller assembly 18 and tubular guides 24 of FIGS. 3 through 6) or other suitable delivering means, is sliced by the knife 226 before exiting the cutting head 216 through a gate 240 (FIGS. 13 and 14). The knife holder 230 is configured for assembly with the corrugated knife 226 so that a leading portion of the knife 226 that defines a cutting edge 227 projects beyond a leading edge 246 of the holder 230, as depicted in FIGS. 14 through 17. The knife 226 has oppositely-disposed surfaces 229 and 231 (FIGS. 16 through 18) that terminate at the cutting edge 227.

Figure 18:
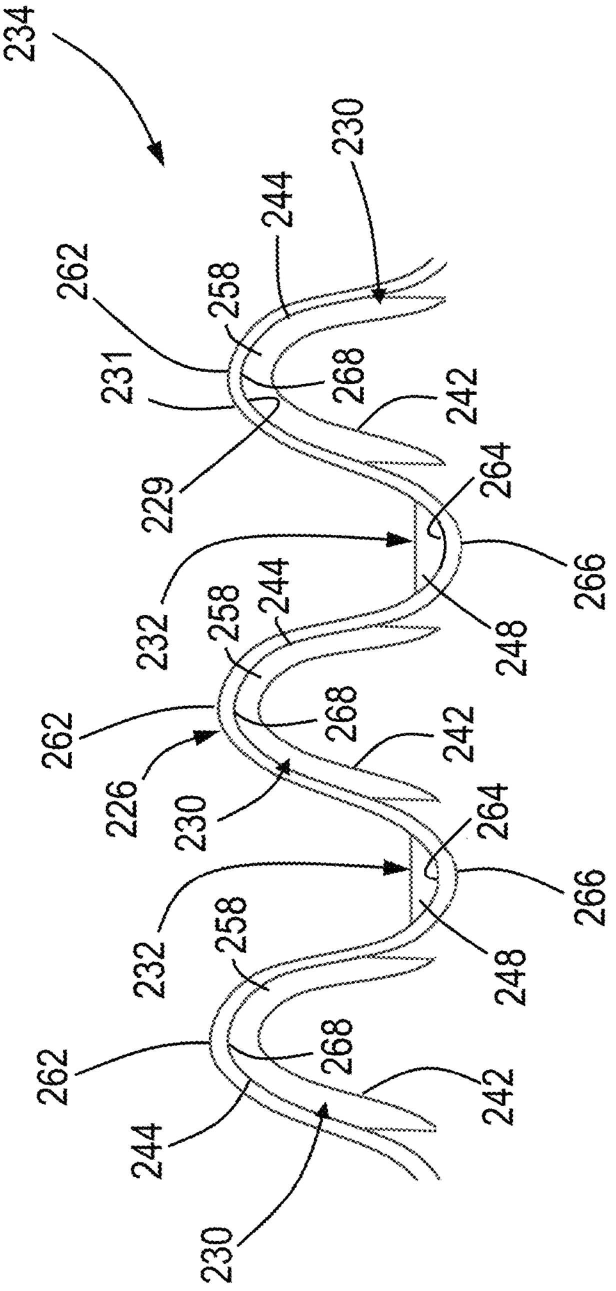
FIG. 18 is a cross-section taken along section line 18-18 of FIG. 17, and depicts the relative cross-sectional shapes of the knife, the fingers of the knife holder, and the fingers of the clamp.
Figure 19:
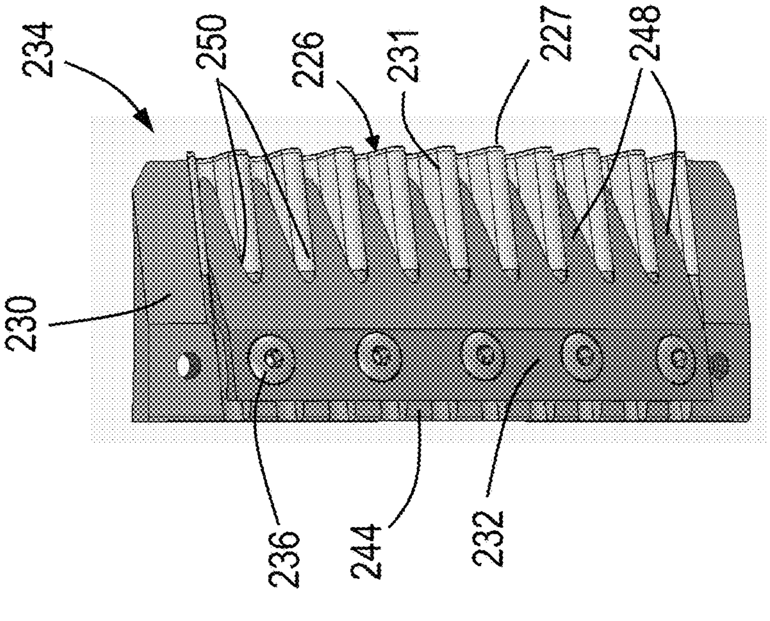
FIGS. 19, 20, and 21 are perspective views showing, respectively, the knife assembly of FIG. 15, the knife assembly of FIG. 19 with the clamp removed, and the knife assembly of FIG. 19 with the clamp and knife removed.
Figure 20:
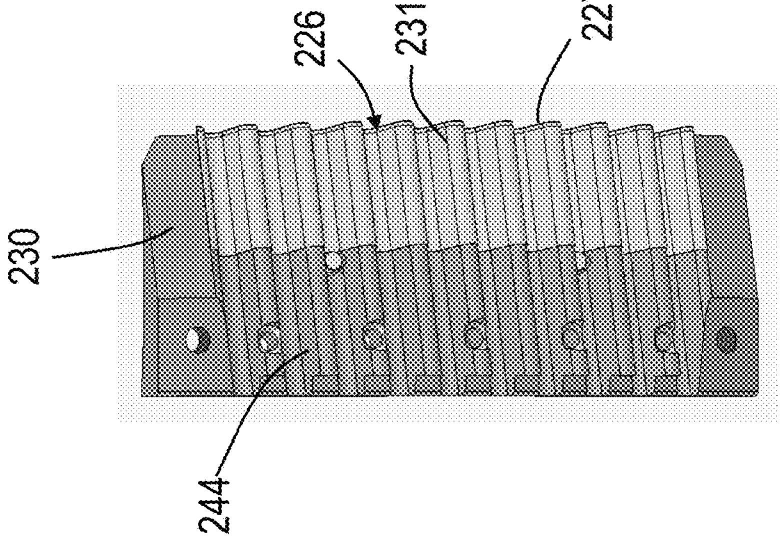
Figure 21:
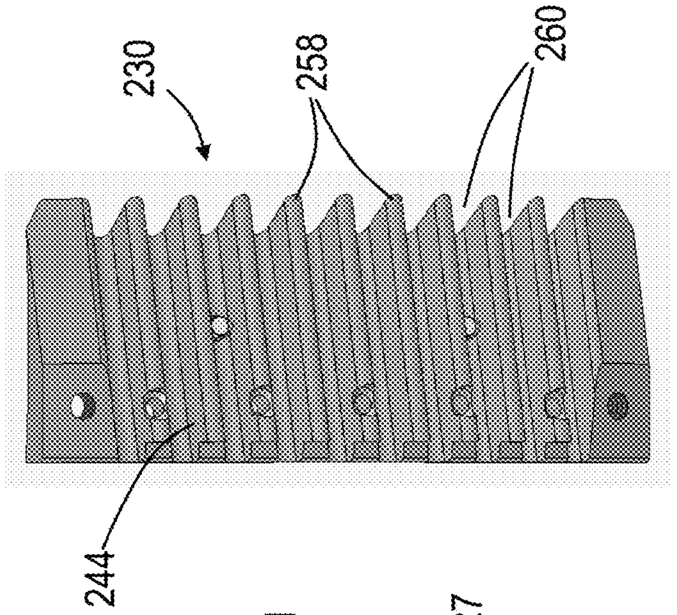

As previously noted, the knife 226 is considered to be "corrugated" as a result of its cutting edge 227, as well as at least adjacent portions of the surfaces 229 and 231 of the knife 226, being characterized by a pattern of peaks and valleys when the knife 226 is viewed edgewise. A representative but nonlimiting example of a corrugated shape is represented in the cross-sectional view of FIG. 18, in which the corrugated shape is represented as periodic, as a nonlimiting example, substantially sinusoidal. In FIG. 18, the pattern of peaks and valleys formed at the cutting edge 227 of the knife 226 results in peaks 262 and valleys 264 that are present on the surface 231 facing the clamp 232 and facing away from the knife holder 230, and peaks 266 and valleys 268 that are present on the surface 229 facing the knife holder 230 and facing away from the clamp 232. However, knives within the scope of the invention are not restricted to any particular shape or pattern of peaks and valleys.

Figures 9A, 9B:
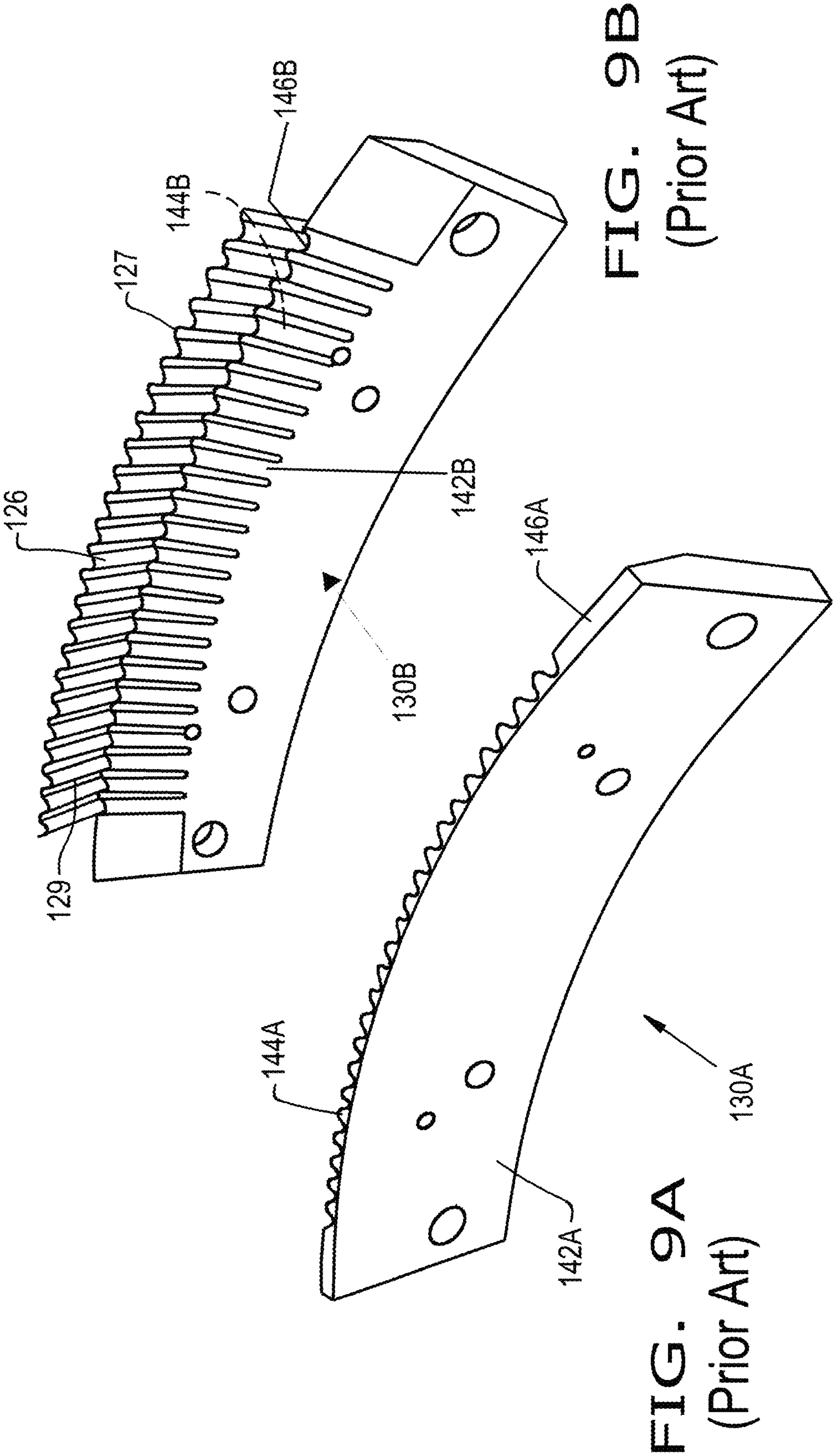
FIG. 9B (Prior Art)
FIG. 9A (Prior Art)
FIGS. 9A and 9B are perspective views of two versions of knife holders suitable for use with the machines represented in FIGS. 2 through 7, wherein the knife holder of FIG. 9A has a knife seat having a periodic pattern complementary to a corrugated knife, and the knife holder of FIG. 9B has a knife seat having a periodic pattern complementary to a corrugated knife mated therewith and an oppositely-disposed registration surface having a periodic pattern similar to that of the corrugated knife.
Figure 10:
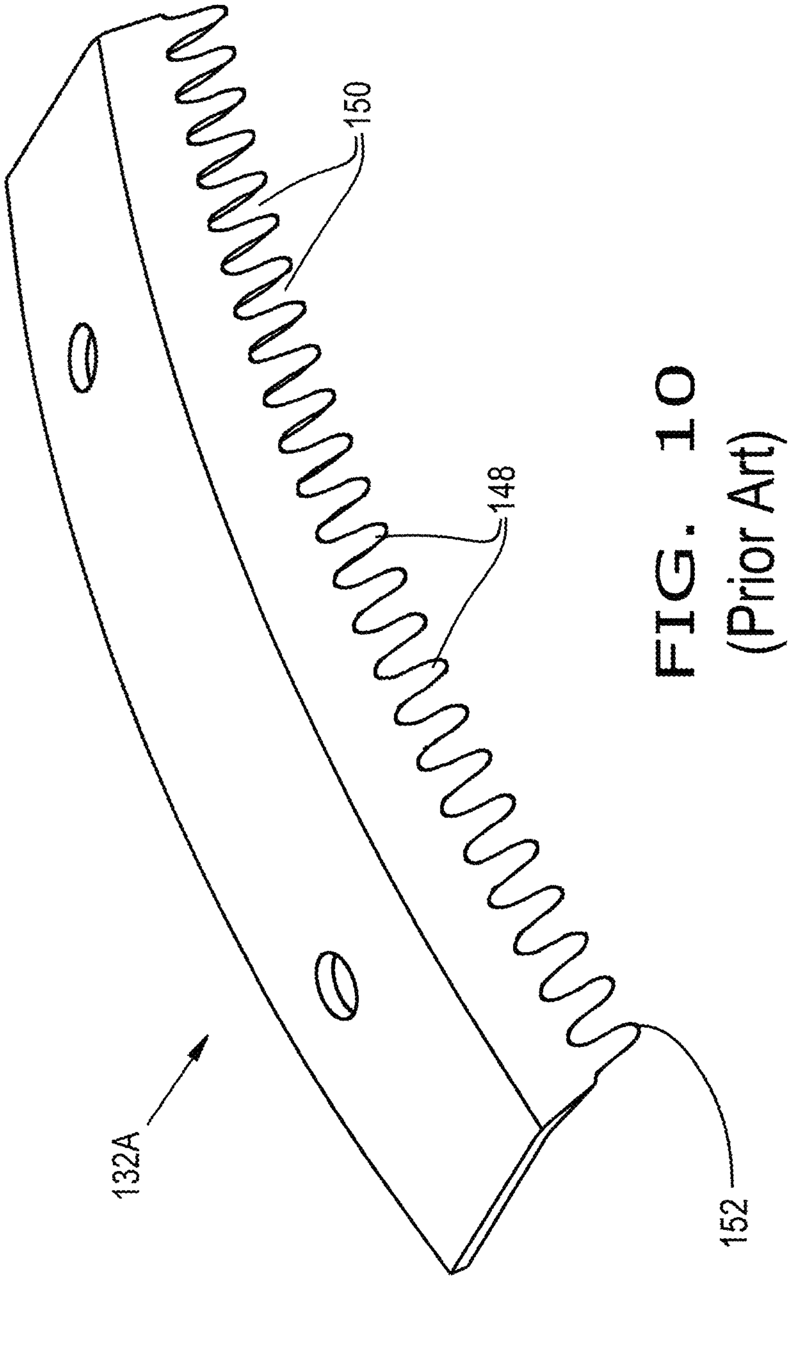
FIG. 10 (Prior Art)
FIG. 10 represents a knife clamp suitable for use with the knife holders of FIGS. 9A and 9B.
Figure 11:
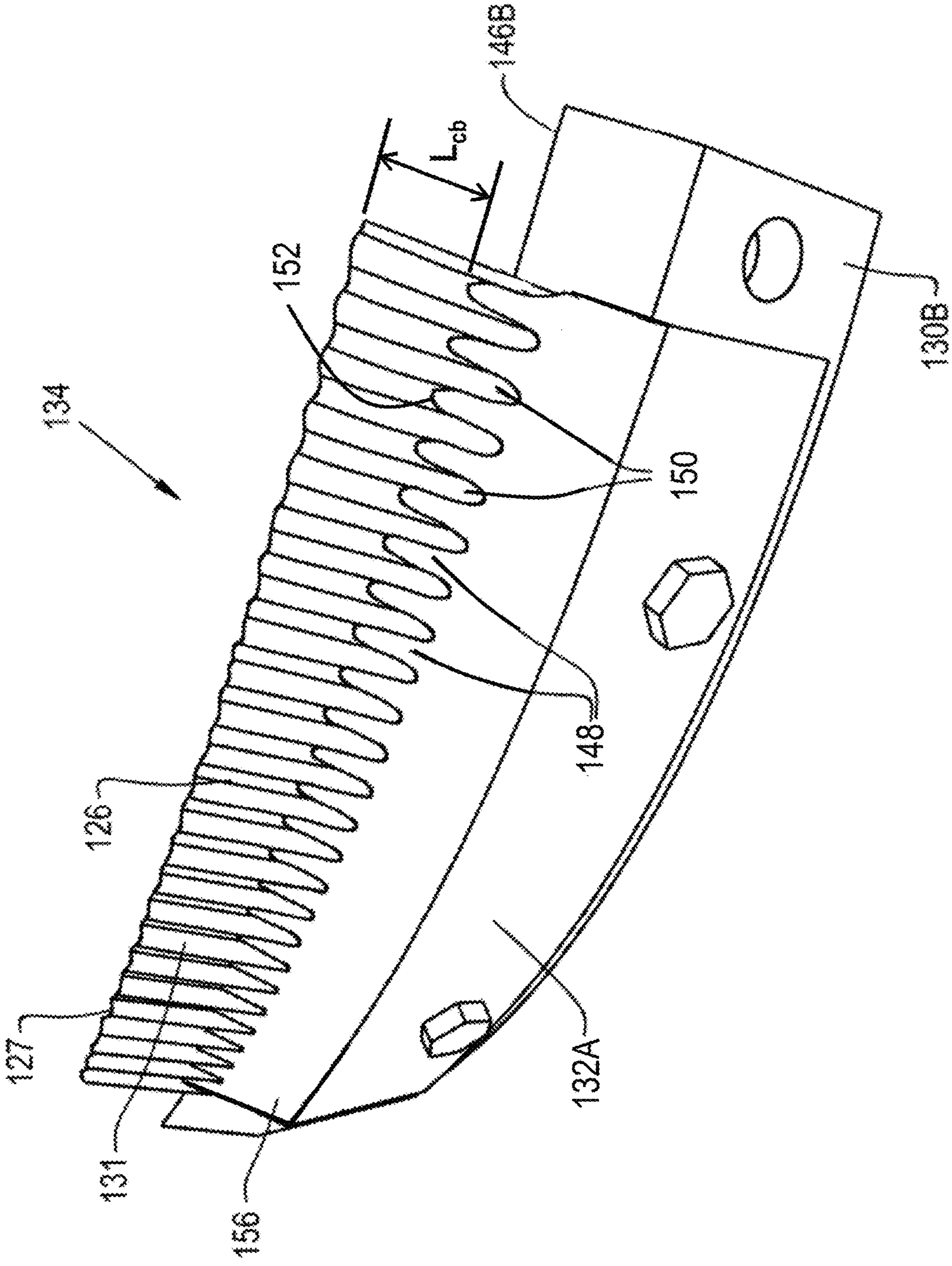
FIG. 11 (Prior Art)
FIG. 11 is an image showing a knife assembly comprising the knife and knife holder of FIG. 9B and the knife clamp of FIG. 10, the latter of which clamps the knife to the knife holder.

The knife holder 230 has a knife seat 244 formed to have a pattern of peaks and valleys complementary to the peaks and valleys of the corrugated knife 226 to be mated thereto. The knife holder 230 further has a registration surface 242 that is opposite its knife seat 244. In the nonlimiting embodiment represented in FIGS. 12 through 21, the registration surface 242 is shaped to define a pattern of peaks and valleys that is complementary to that of the corrugated knife 226. The shapes of the registration surface 242 and knife seat 244 of the knife holder 230 are in phase, such that the leading edge 246 of the knife holder 230 is sharp and substantially of constant thickness, similar to that of the knife holder 130B of FIG. 9B. The knife seat 244 is preferably configured to substantially or entirely fill the openings or gaps between the knife 226 and the knife holder 230 that would otherwise result from the valleys 268 in the surface 229 of the knife 226 contacting the knife seat 244 of the knife holder 230.

Figure 16:
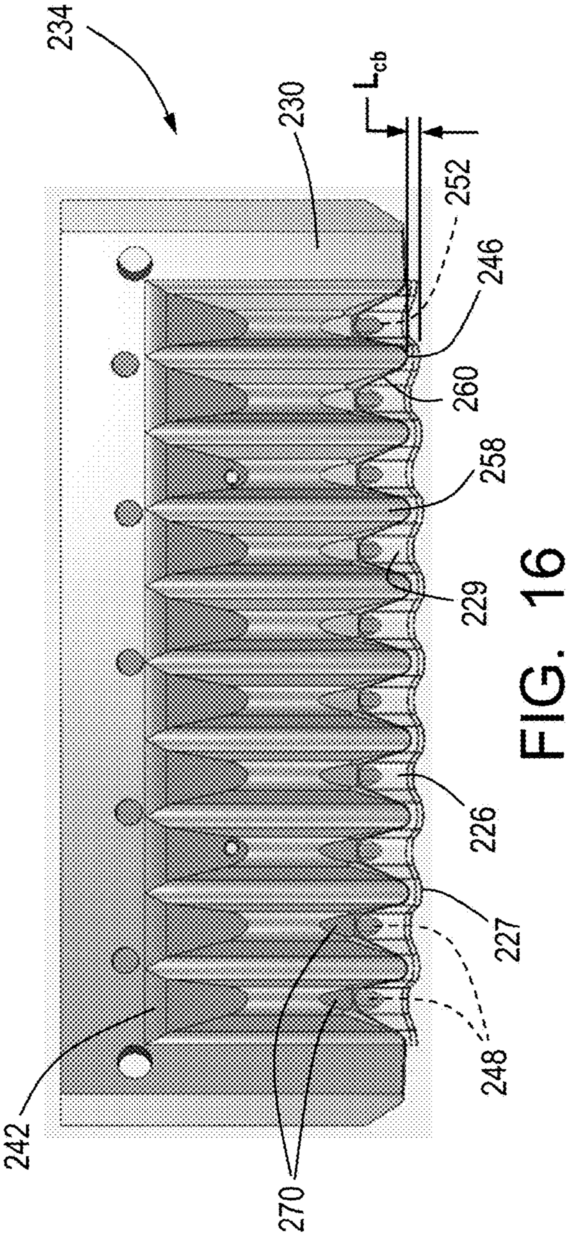
FIG. 16 is an isolated plan view of an interior side of the knife assembly of FIG. 15 that faces the interior of the cutting head of FIG. 12. The knife is shown as translucent in order to reveal distal tips of the fingers of the clamp on the opposite (exterior) side of the knife assembly.
Figure 17:
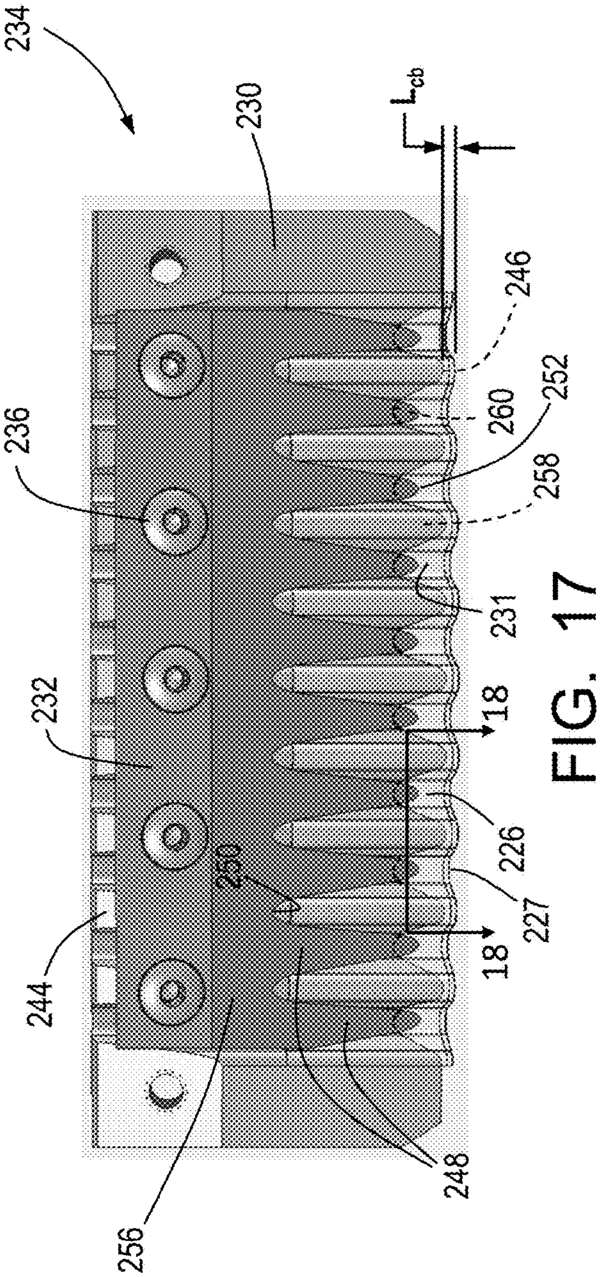
FIG. 17 is an isolated plan view of an exterior side of the knife assembly of FIG. 15 that faces the exterior of the cutting head of FIG. 12. The knife is shown as translucent in order to reveal fingers of the knife holder on the opposite (interior) side of the knife assembly.

As particularly evident from FIGS. 16 and 17, the leading edge 246 of the knife holder 230 is fabricated to define extensions or "fingers" 258 and notches or recesses 260 therebetween to define a pattern (as a nonlimiting example, a periodic pattern) complementary to the pattern of peaks and valleys present on the surface 229 of the knife 226. FIG. 16 depicts the registration surface 242 of the knife holder 230 and its fingers 258. FIG. 17 depicts the knife seat 244 of the knife holder 230, and shows the knife 226 as translucent in order to reveal the fingers 258 of the knife holder 230 on the opposite side of the knife assembly 234. The fingers 258 and notches 260 of the knife holder 230 engage, respectively, the valleys 268 and peaks 266 present on the surface 229 of the knife 226 facing the knife holder 230 and facing away from the clamp 232. Though the fingers 258 and notches 260 of the knife holder 230 may be formed by various techniques, the fingers 258 and notches 260 can be seen in FIGS. 14 and 15 as defined at the leading edge 246 of the knife holder 230 as a result of a bevel 270 at the leading edge 246 so that peaks of the knife holder 230 that are present at the knife seat 244 and engage the valleys 268 of the knife 226 on the surface 229 of the knife 226 facing the knife holder 230 protrude beyond valleys of the knife holder 230 that are present at the knife seat 244 and engage the peaks 266 of the knife 226 on the surface 229 of the knife 226 facing the knife holder 230.

As particularly evident from FIGS. 12, 13, 17, 19, the clamp 232 has a tapered portion that defines a sloping outer surface 256 at its leading edge to gently direct slices up and over the clamp 232 as they leave the cutting head 216. The tapered portion of the clamp 232 is fabricated to define extensions or "fingers" 248 and notches or recesses 250 therebetween to define a pattern (as a nonlimiting example, a periodic pattern) complementary to the pattern of peaks and valleys of the knife 126 that is secured by the clamp 232 to the knife holder 230. The fingers 248 and notches 250 of the clamp 232 engage, respectively, the valleys 264 and peaks 262 present on the surface 231 of the knife 226 facing the clamp 232 and facing away from the knife holder 230. As a result of the fingers 248 of the clamp 232 and the fingers 258 of the knife holder 230 engaging valleys 264 and 268 on opposite surfaces 229 and 231 of the knife 226, the fingers 248 of the clamp 232 are interdigitated with the fingers 258 of the knife holder 230, as evident from FIGS. 16 and 17 which show the knife 226 as translucent in order to reveal, respectively, distal tips of the fingers 248 of the clamp 232 on the opposite (exterior) side of the knife assembly 234 and the fingers 258 of the knife holder 230 on the opposite (interior) side of the knife assembly 234. The interdigitation of the fingers 248 and 258 of the clamp 232 and knife holder 230 is believed to improve the stability and rigidity of the knife 226 and its cutting edge 227. In the nonlimiting embodiment shown, and as particularly evident from FIG. 17, the leading edge 252 of the clamp 232 defined by the distal tips of the fingers 248, which physically engage the valleys 264 in the surface 231 of the knife 226 facing the clamp 232, extend beyond the leading edge 246 of the knife holder 230 defined by the most recessed edges of the notches 260 of the knife holder 230, and the leading edge 246 of the knife holder 230 defined by the distal tips of the fingers 258, which physically engage the valleys 268 in the surface 229 of the knife 226 facing the knife holder 230, extend beyond the leading edge 252 of the clamp 232 defined by the most recessed edges of the notches 250 of the clamp 232. Furthermore, the nonlimiting embodiment of FIGS. 16 and 17 show the fingers 258 of the knife holder 230 as extending beyond the leading edge 252 of the clamp 232 at the fingers 248 of the clamp 232. Consequently, in the nonlimiting embodiment shown, FIGS. 16 and 17 indicate that the knife 226 has a cantilevered beam length ($L_{cb}$) that is defined by the length or distance between the cutting edge 227 of the knife 226 and the leading edge 246 of the knife holder 230 at the distal ends of its fingers 258, which physically engage the surface 229 of the knife 226 within the valleys 268 of the knife 226 facing the knife holder 230 as shown in FIG. 18.

As evident from FIG. 18, the fingers 248 of the clamp 232 may also be configured to at least partially close openings or gaps between the clamp 232 and the corrugated knife 226 that would otherwise be present as a result of the valleys 264 in the surface 231 of the knife 226, thereby reducing solids accumulation between the knife 226 and clamp 232.

While the invention has been described in terms of specific embodiments, it is apparent that other forms could be adopted by one skilled in the art. For example, the knives 226, knife holders 230, and clamps 232 could differ in appearance and construction from the embodiments shown in the drawings and used with machines, impeller assemblies, and cutting heads that differ in appearance and construction from what is shown in the drawings, certain functions of their components could be performed by components of different construction but capable of a similar (though not necessarily equivalent) function, and various materials and processes could be used to fabricate the knife assemblies and their components. Though the nonlimiting embodiments of the cutting heads shown in the drawings are particularly adapted to cut food products into slices, it is foreseeable that the knife assemblies 234 could be used in combination with cutting heads adapted for slicing other materials. As such, and again as was previously noted, it should be understood that the invention is not necessarily limited to any embodiment described herein or illustrated in the drawings.

The invention claimed is:

1. A knife assembly comprising:

a corrugated knife;

a knife holder having a registration surface and an oppositely-disposed knife seat that terminate at a leading edge of the knife holder, the knife seat being mated with a first surface of the corrugated knife, and peaks and valleys of the knife holder are present at the knife seat and engage, respectively, valleys and peaks of the corrugated knife on the first surface of the corrugated knife; and a clamp;

wherein the knife holder has a bevel that adjoins the registration surface and adjoins the knife seat at the leading edge of the knife holder and extends from the registration surface to the knife seat at an inclination relative to each of the registration surface and the knife seat and the peaks of the knife holder protrude beyond the valleys of the knife holder at the leading edge of the knife holder, the leading edge of the knife holder is defined by fingers at the peaks thereof and notches therebetween at the valleys thereof, and the fingers of the knife holder engage the valleys in the first surface of the corrugated knife;

wherein the clamp is mated with a second surface of the corrugated knife and secures the corrugated knife to the knife holder, the clamp has a leading edge defined by fingers and notches therebetween, and the fingers of the clamp engage valleys on the second surface of the corrugated knife such that the fingers of the clamp are interdigitated with the fingers of the knife holder.

2. A knife assembly of a slicing machine adapted to slice products, the knife assembly comprising:

a corrugated knife having oppositely-disposed first and second surfaces that terminate at a cutting edge, the cutting edge and at least portions of the first and second surfaces adjacent thereto being characterized by a pattern of peaks and valleys so that peaks and valleys are present on the first surface and peaks and valleys are present on the second surface;

a knife holder having a registration surface and an oppositely-disposed knife seat that terminate at a leading edge, the knife seat being mated with the first surface of the corrugated knife, the knife seat comprising a pattern of peaks and valleys complementary to the peaks and valleys in the first surface of the corrugated knife, the leading edge of the knife holder being defined by fingers and notches therebetween, the fingers of the knife holder engaging at least some of the valleys in the first surface of the corrugated knife, the notches of the knife holder engaging at least some of the peaks in the first surface of the corrugated knife; and a clamp mated with the second surface of the corrugated knife and securing the corrugated knife to the knife seat of the knife holder, the clamp having a leading edge defined by fingers and notches therebetween that define a pattern complementary to the peaks and valleys in the second surface of the corrugated knife, the fingers of the clamp engaging at least some of the valleys on the second surface of the corrugated knife;

wherein the fingers of the clamp are interdigitated with the fingers of the knife holder; and wherein the knife holder has a bevel that adjoins the registration surface and adjoins the knife seat at the leading edge thereof and extends from the registration surface to the knife seat at an inclination relative to each of the registration surface and the knife seat and the peaks of the knife holder protrude beyond the valleys of the knife holder at the leading edge of the knife holder, the fingers of the knife holder are at the peaks of the knife holder, and the notches of the knife holder are at the valleys of the knife holder.

3. The knife assembly of claim 2, wherein the pattern of peaks and valleys of the corrugated knife is a periodic pattern.

4. The knife assembly of claim 2, wherein the fingers of the clamp extend beyond the leading edge of the knife holder at the notches of the knife holder located between the fingers of the knife holder.

5. The knife assembly of claim 2, wherein the fingers of the knife holder extend beyond the leading edge of the clamp at the notches of the clamp located between the fingers of the clamp.

6. The knife assembly of claim 2, wherein the fingers of the knife holder extend beyond the leading edge of the clamp at the fingers of the clamp.

7. The knife assembly of claim 2, wherein the registration surface of the knife holder comprises a pattern of peaks and valleys complementary to the pattern of peaks and valleys in the knife seat of the knife holder.

8. The knife assembly of claim 2, wherein the knife assembly is secured to a segment of a cutting head.

9. The knife assembly of claim 8, wherein the cutting head is configured so that the knife assembly produces slices or chips of a lattice type.

10. A slicing machine for slicing products, the slicing machine comprising:

a cutting head having an annular shape that defines an axis of the cutting head;

at least one knife assembly having a corrugated knife oriented axially at a perimeter of the cutting head and extending radially inward into an interior of the cutting head, the corrugated knife having oppositely-disposed first and second surfaces that terminate at a cutting edge, the cutting edge and at least portions of the first and second surfaces adjacent thereto being characterized by a pattern of peaks and valleys so that peaks and valleys are present on the first surface and peaks and valleys are present on the second surface;

an impeller assembly coaxially mounted within the cutting head for rotation about the axis of the cutting head in a rotational direction relative to the cutting head, the impeller assembly comprising means for delivering products toward the perimeter of the cutting head as the impeller assembly rotates within the cutting head;

wherein the knife assembly further comprises:

a knife holder having a registration surface and an oppositely-disposed knife seat that terminate at a leading edge, the knife seat being mated with the first surface of the corrugated knife, the knife seat comprising a pattern of peaks and valleys complementary to the peaks and valleys in the first surface of the corrugated knife, the leading edge of the knife holder being defined by fingers and notches therebetween, the fingers of the knife holder engaging at least some of the valleys in the first surface of the corrugated knife, the notches of the knife holder engaging at least some of the peaks in the first surface of the corrugated knife; and a clamp mated with the second surface of the corrugated knife and securing the corrugated knife to the knife seat of the knife holder, the clamp having a leading edge defined by fingers and notches therebetween that define a pattern complementary to the peaks and valleys in the second surface of the corrugated knife, the fingers of the clamp engaging at least some of the valleys on the second surface of the corrugated knife;

wherein the fingers of the clamp are interdigitated with the fingers of the knife holder; and wherein the knife holder has a bevel that adjoins the registration surface and adjoins the knife seat at the leading edge thereof and extends from the registration surface to the knife seat at an inclination relative to each of the registration surface and the knife seat and the peaks of the knife holder protrude beyond the valleys of the knife holder at the leading edge of the knife holder, the fingers of the knife holder are at the peaks of the knife holder, and the notches of the knife holder are at the valleys of the knife holder.

11. The slicing machine of claim 10, wherein the delivering means rotates about an axis thereof so that products within the delivering means rotate about axes thereof while the impeller assembly rotates about the axis of the cutting head.

12. The slicing machine of claim 10, wherein the pattern of peaks and valleys of the corrugated knife is a periodic pattern.

13. The slicing machine of claim 10, wherein the fingers of the clamp extend beyond the leading edge of the knife holder at the notches of the knife holder between the fingers of the knife holder.

14. The slicing machine of claim 10, wherein the fingers of the knife holder extend beyond the leading edge of the clamp at the notches of the clamp between the fingers of the clamp.

15. The slicing machine of claim 10, wherein the fingers of the knife holder extend beyond the leading edge of the clamp at the fingers of the clamp.

16. The slicing machine of claim 10, wherein the registration surface of the knife holder comprises a pattern of peaks and valleys complementary to the pattern of peaks and valleys in the knife seat of the knife holder.

17. The slicing machine of claim 10, wherein the knife assembly is secured to a segment of the cutting head.

18. The slicing machine of claim 10, wherein the cutting head and the impeller assembly are configured so that the knife assembly produces slices or chips of a lattice type.

19. A method of using the slicing machine of claim 10 to produce slices or chips of a lattice type.

20. The method of claim 19, the method comprising:

rotating the impeller assembly;

supplying products to the impeller assembly;

delivering the products to the perimeter of the cutting head through action of rotating the impeller assembly and the delivering means; and slicing the products with the corrugated knife to produce the slices or chips of the lattice type.

21. The method of claim 19, wherein the products are food products.

* * * * *